T. E. MURRAY.
METER TESTING CUT-OUT.
APPLICATION FILED OCT. 25, 1910.
995,627.
Patented June 20, 1911.
2 SHEETS—SHEET 1.
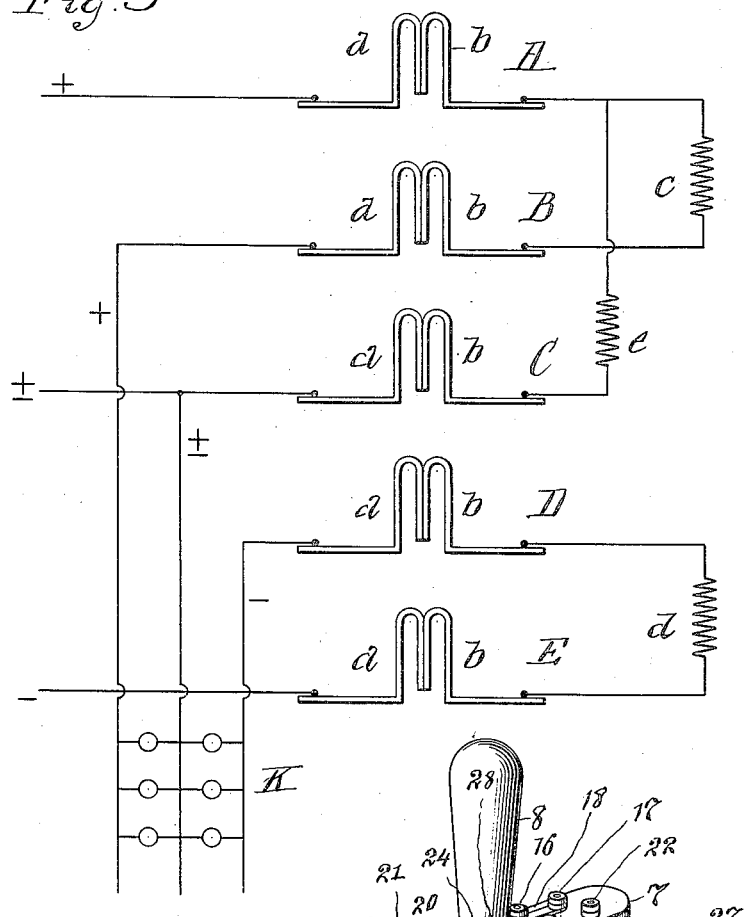
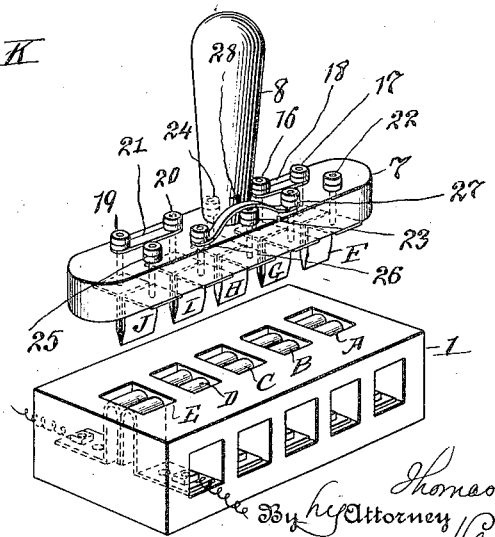

T. E. MURRAY.
METER TESTING CUT-OUT.
APPLICATION FILED OCT. 25, 1910.

995,627.

Patented June 20, 1911.
2 SHEETS—SHEET 2.

Witnesses:
Allen W. Goose
May T. McGarry

Inventor
Thomas E. Murray
By his Attorney
Carl Benjamin

UNITED STATES PATENT OFFICE.

THOMAS E. MURRAY, OF NEW YORK, N. Y.

METER-TESTING CUT-OUT.

995,627.

Specification of Letters Patent. Patented June 20, 1911.

Application filed October 25, 1910. Serial No. 588,955.

*To all whom it may concern:*

Be it known that I, THOMAS E. MURRAY, a citizen of the United States, residing at New York, in the county of New York and State of New York, have invented a certain new and useful Improvement in Meter-Testing Cut-Outs, of which the following is a specification.

The invention is a meter testing cut-out designed for use in connection with the usual service and local conductors.

It comprises a cut-out box and pairs of separable spring contact plates therein, which are connected to the terminals of the service and local conductors and of the meter. A single manually operated device, to which may previously be connected the standardizing or testing apparatus, is applied to the said contact plates, with the result that the circuit to the meter is first opened without breaking circuit between the service and local conductors, and then, as the device is pushed to its seat, circuit is closed from a service conductor through the standardizing apparatus and meter.

The device is here shown as constructed for a three wire service and local system.

Figure 4:
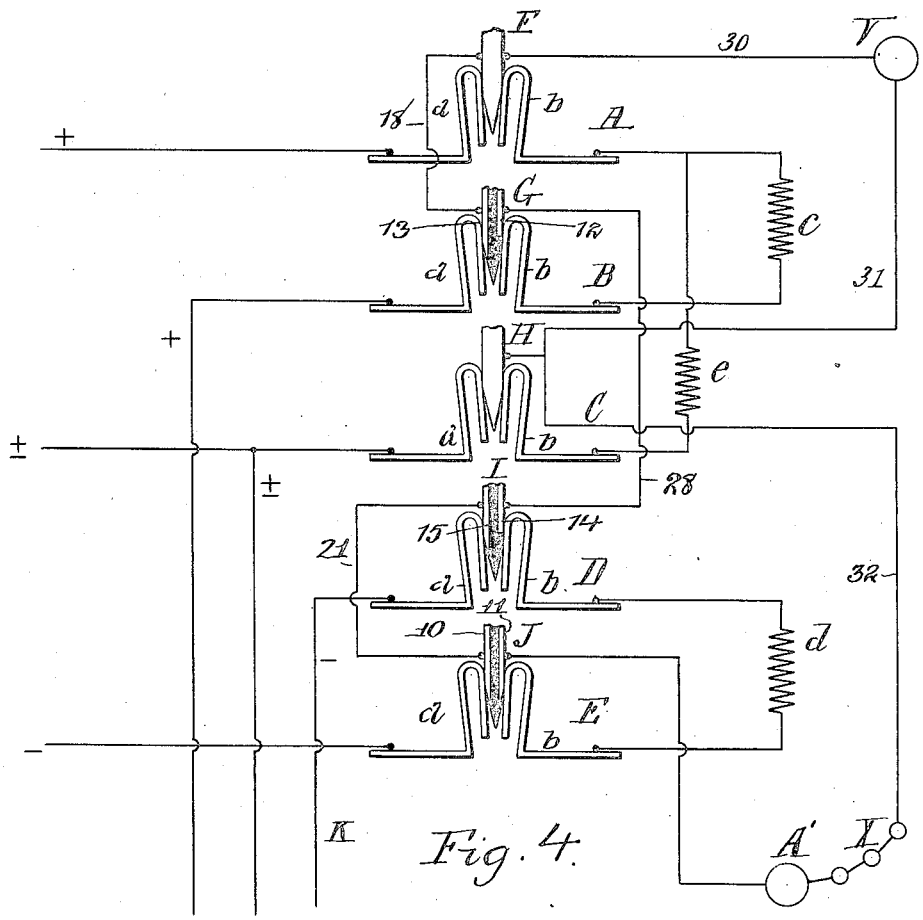
Figure 2:
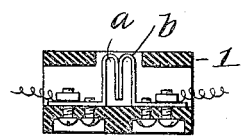

In the accompanying drawings—Figure 1 is a perspective view of my cut-out showing the operating bar raised and separate from the box. Fig. 2 is a sectional view of one of the pairs of contact plates in said box. Figs. 3 and 4 are diagrams. Fig. 3 shows the normal condition of the contacts and circuits. Fig. 4 shows the circuits when the meter and standardizing apparatus are inserted.

Similar numbers and letters of reference indicate like parts.

1 is a cut-out box, preferably of porcelain, containing five openings, in each of which is inserted a pair of separable spring contacts A, B, C, D, E.

7 is a supporting block of refractory insulating material provided with a handle 8. Depending from said bar are five projections F, G, H, I, J. The projections H and F are of conducting material. The projection J is of insulating material having on its opposite sides metal contact plates 10, 11, of equal length. On the projections G and I, also of insulating material, the metal contact plates 12, 14, are shorter than the plates 13, 15. On the upper side of the block 7 are binding posts which are connected as follows: Binding posts 16 and 17 are individually connected to projection F and plate 13 of projection G. They are also connected together by a metal bridge 18 on top of the bar 7. Binding posts 19 and 20 are individually connected to the plate 10 of projection J and to the plate 15 on projection I. They are also connected by a bridge 21 on top of the bar 7. Binding post 22 is connected to projection F. Binding posts 23 and 24 are connected to projection H. Binding post 25 is connected to plate 11 on projection J. Binding post 26 is connected to plate 14 of projection I. Binding post 27 is connected to plate 12 of projection G. Said binding posts 26 and 27 are connected together on the upper side of the bar 7 by a metal bridge 28.

Referring first to Fig. 4 which shows the normal conditions: The service conductors of a three-wire system are connected, as shown, to the contact plates *a* of the pairs of contact plates A, C and E. The local conductors are shown at K. The neutral local conductor connects directly to the neutral service conductor. The positive local conductor connects to the plate *a* of the pair of contacts B, and the negative local conductor connects to the plate *a* of the pair of contacts D. The plates *b* of A and B are connected through one field coil *c*, and the plates *b* of the pairs of contacts D, E, are connected through the other field coil *d* of the meter. The potential coil *e* of the meter is connected to the plates *b* of pairs of contacts A and C. Obviously, under this condition of the circuit, the service conductors and the meter are connected to the local conductors K or customer's load.

When it is desired to test the meter without interrupting circuit to the local conductors, the ends of the projections on bar 7 are inserted between the spring contacts, as A, B, C, D, E. Although the members of the pairs of contacts are thus separated, the circuit from the service conductors to the local conductors is not broken because it proceeds from positive service conductor to plate *a* of pair A, projection F, bridge 18 and plate 13 of projection G, and plate *a* of pair B, to positive local conductor; and similarly from negative service conductor to plate *a* of pair of contacts E, plate 10 on projection J, bridge 21, plate 15 of projection I, to plate *a* of pair D, to negative local conductor.

The circuit to the meter and testing instruments is, however, broken until the projections are unitedly pushed down between the contact plates sufficiently to bring the short plate 12 on projection G and the short plate 14 on projection I into contact with the plates $b$ of pairs B, D, which, as already stated, are connected by the bridge 28.

The terminals of the voltmeter being connected to binding posts 22 and 23, the circuit through that instrument is as follows: from positive conductor, to plate $a$ of pair A, projection F, by wire 30 to voltmeter V, wire 31, projection H, plate $a$ of pair C, and so to neutral conductor. The terminals of the ammeter A' and artificial load X in series therewith being connected to binding posts 24 and 25, the circuit through this instrument and load is as follows: from positive conductor, to plate $a$ of pair A, projection F, plate $b$ of pair A, meter coil $c$, plate $b$ of pair B, plate 12 of projection G, bridge 28, plate 14 of projection I, plate $b$ of pair D, meter coil $d$, plate $b$ of pair E, plate 11 of projection J, ammeter A', load X, wire 32, projection H, plate $a$ of pair C, and so to neutral conductor.

The standardizing apparatus—here the voltmeter, ammeter and artificial load—are now in circuit with the meter which thus may be conveniently tested; and this connection has been made without interrupting the service to the local conductors or customer's load.

Particular attention is called to the following facts: The foregoing result has been attained by the employment of a single device—namely, the bar 7 with its projections and handle—which is applied directly to the separable spring contacts and simply pushed down between them until seated. The operator can at once read his testing instruments, and then withdraw the device, leaving the circuits as he found them. All consecutively thrown switches, separately introduced bridges, and other devices requiring more or less manipulation, are avoided. There is no interference with the customer's load at any time, and the device cannot wrongly be used.

The term "standardizing apparatus" used in the claims means any apparatus which it may be found desirable to connect in circuit with the meter in order to correct or verify its readings.

I claim:

1. The combination with service line conductors, local conductors, a meter, standardizing apparatus, and circuit closers disposed in the circuits of said service conductors, local conductors and meter, of a portable device applicable as a unit to said circuit closers for opening the circuit closed to said meter, without breaking circuit between said service and local conductors, and thereafter closing circuit from a service conductor through said standardizing apparatus and meter.

2. In combination with the line service conductors and local conductors, a meter, standardizing apparatus therefor, and normally closed separable contacts at the terminals of said service conductors, local conductors and said meter, a device applicable as a unit to said contacts for opening the circuit closed through said contacts to said meter without breaking circuit between said service and local conductors and thereafter closing circuit from a service conductor through said standardizing apparatus and meter.

3. In combination with the service conductors and local conductors, and normally closed separable contacts at the terminals of said service conductors, local conductors and said meter, a portable standardizing apparatus, a device connected to said apparatus and applicable as a unit to said contacts for opening the circuit closed through said contacts to said meter without breaking circuit between said service and local conductors, and thereafter closing circuit from a service conductor through said standardizing apparatus and meter.

4. In combination with the service conductors and local conductors, a meter, normally closed separable contacts at the terminals of said service conductors and said meter, a device comprising a support, and a plurality of fixed circuit controlling contacts thereon, and a standardizing apparatus connected to certain of said contacts, and bridges on said support connecting certain other of said contacts: the said device being applicable to said separable contacts to open circuit closed through the same to said meter without breaking circuit between said service and local conductors, and thereafter to close circuit from a service conductor through said standardizing apparatus and meter.

5. In combination with the service conductors and local conductors of a three wire system, a meter, normally closed separable spring contacts at the terminals of said service conductors and said meter, a support, a plurality of projections thereon for entering between and separating said contacts, two of said projections H, F being of conducting material and entering pairs of contacts respectively interposed in the positive and neutral service conductors, one of said projections J having two mutually insulated contact plates 10, 11 of equal length and entering a pair of contacts interposed between a negative service conductor and said meter, two of said projections G, I each having two contact plates 12, 13 and 14, 15 of unequal length and entering pairs of contacts respectively interposed between the meter and the positive local conductor and between the meter and the negative local conductor, a testing voltmeter connected to projections H and F, a testing ammeter connected to projection H and plate 11 of projection J, and on said support three bridges, one connecting the short contact plates 12, 14 of projections G, I, another bridge connecting projection F and plate 13 of projection G, and a third bridge connecting plate 10 of projection J and plate 15 of projection I.

In testimony whereof I have affixed my signature in presence of two witnesses.

THOMAS E. MURRAY.

Witnesses:
    GERTRUDE T. PORTER,
    MAY T. McGARRY.